United States Patent
Hallett

(10) Patent No.: US 10,620,006 B2
(45) Date of Patent: Apr. 14, 2020

(54) OBJECT RECOGNITION AND TRACKING USING A REAL-TIME ROBOTIC TOTAL STATION AND BUILDING INFORMATION MODELING

(71) Applicant: Topcon Positioning Systems, Inc., Livermore, CA (US)

(72) Inventor: Jason Hallett, Dublin, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 215 days.

(21) Appl. No.: 15/922,069

(22) Filed: Mar. 15, 2018

(65) Prior Publication Data

US 2019/0285413 A1    Sep. 19, 2019

(51) Int. Cl.

| | | |
|---|---|---|
| G06K 9/00 | (2006.01) | |
| G01C 15/00 | (2006.01) | |
| H04W 4/80 | (2018.01) | |
| H04W 4/029 | (2018.01) | |
| G06K 9/32 | (2006.01) | |
| G01S 19/00 | (2010.01) | |

(52) U.S. Cl.
CPC ............ *G01C 15/002* (2013.01); *G01S 19/00* (2013.01); *G06K 9/00671* (2013.01); *G06K 9/3241* (2013.01); *H04W 4/029* (2018.02); *H04W 4/80* (2018.02)

(58) Field of Classification Search
CPC ............ G06K 9/00671; G06K 9/3241; G06K 9/00791; G01C 15/002; H04W 4/80; H04W 4/02; G01S 19/00; G01S 19/42; G01S 19/52; G01S 19/53; G01S 19/48
USPC ......................................................... 382/153
See application file for complete search history.

(56) References Cited

U.S. PATENT DOCUMENTS

| | | | |
|---|---|---|---|
| 6,034,722 A | 3/2000 | Viney et al. | |
| 6,035,254 A | 3/2000 | Nichols | |
| 6,489,934 B1 | 12/2002 | Klausner | |
| 6,727,849 B1 | 4/2004 | Kirk et al. | |
| 7,212,563 B2 | 5/2007 | Boyd et al. | |
| 7,423,742 B2 | 9/2008 | Gatsios et al. | |
| 7,541,927 B2 | 6/2009 | Dupler et al. | |
| 9,255,798 B2 | 2/2016 | Kahlow | |
| 9,367,962 B2 | 6/2016 | Di Federico et al. | |
| 9,443,311 B2 | 9/2016 | Hallett | |
| 2006/0085813 A1 | 4/2006 | Giraldin et al. | |
| 2007/0019212 A1 | 1/2007 | Gatsios et al. | |
| 2009/0024325 A1 | 1/2009 | Scherzinger | |
| 2012/0323534 A1 | 12/2012 | Kahle et al. | |

(Continued)

FOREIGN PATENT DOCUMENTS

| | | |
|---|---|---|
| EP | 3054404 A1 | 8/2016 |
| EP | 3222969 A1 | 9/2017 |
| WO | 2007078832 A2 | 7/2017 |

OTHER PUBLICATIONS

International Search Report and Written Opinion dated Jul. 10, 2019, in connection with International Patent Application No. PCT/US2019/021277, 15 pgs.

(Continued)

*Primary Examiner* — Ali Bayat

(74) *Attorney, Agent, or Firm* — Chiesa Shahinian & Giantomasi PC

(57) ABSTRACT

An object recognition and positioning system that employs real-time location, a robotic total station, and a building information model in a single, transparent system that delivers object positioning, recognition, tracking, and operation.

26 Claims, 6 Drawing Sheets

(56) References Cited

U.S. PATENT DOCUMENTS

| | | | |
|---|---|---|---|
| 2013/0137079 A1 | 5/2013 | Kahle et al. | |
| 2014/0267685 A1 | 9/2014 | Kahle et al. | |
| 2014/0267772 A1 | 9/2014 | Morin et al. | |
| 2014/0268064 A1 | 9/2014 | Kahle et al. | |
| 2015/0285896 A1 | 10/2015 | Hall et al. | |
| 2015/0369612 A1 | 12/2015 | Nishimura et al. | |
| 2016/0133230 A1* | 5/2016 | Daniels | G06T 19/006 345/633 |
| 2017/0046868 A1* | 2/2017 | Chernov | H04N 13/221 |
| 2017/0353824 A1 | 12/2017 | Hallett | |
| 2017/0374342 A1* | 12/2017 | Zhao | G01B 11/2518 |
| 2019/0213438 A1* | 7/2019 | Jones | A47L 9/009 |
| 2019/0235083 A1* | 8/2019 | Zhang | G01S 7/4808 |
| 2019/0346271 A1* | 11/2019 | Zhang | G01S 7/4808 |

OTHER PUBLICATIONS

International Search Report and Written Opinion dated Jul. 19, 2017, in connection with International Patent Application No. PCT/US2017/031702, 12 pgs.

"Redpoint RTLS Infrastructure," Redpoint Positioning, downloaded on Apr. 1, 2016 from http://redpointpositioning.com/products-services/infrastructure/, 2 pgs.

"High-Precision RTLS," Redpoint Positioning, downloaded on Apr. 1, 2016 from http://www.redpointpositioning.com/wp-content/uploads/2015/05/RP_SolutionsBrochure_WEB.pdf, 4 pgs.

"Redpoint RTLS Tags," Redpoint Positioning, downloaded on Apr. 1, 2016 from http://redpointpositioning.com/products-services/rtls-tags/, 2 pgs.

"High-Precision RTLS Solutions for Constructions," Redpoint Positioning, downloaded on Apr. 1, 2016 from http://www.redpointpositioning.com/rtls-for-vertical-industries/rtls-for-construction/, 3 pgs.

"Redpoint RTLS Products & Services," Redpoint Positioning, downloaded on Apr. 1, 2016 from http://redpointpositioning.com/products-services, 3 pgs.

Topcon PS Series Robotic Total Station, downloaded on Apr. 1, 2016 from https://www.topconpositioning.com/total-station-solutions/robotic-total-stations/ps-series, 4 pgs.

* cited by examiner

OBJECT RECOGNITION AND TRACKING USING A REAL-TIME ROBOTIC TOTAL STATION AND BUILDING INFORMATION MODELING

TECHNICAL FIELD

The present invention relates to positioning systems, and, more particularly, to an object recognition and positioning system utilizing a robotic total station (RTS) in combination with building information modeling (BIM) for real-time object recognition, tracking, and operation.

BACKGROUND

Real-time location systems (RTLS) are used to automatically identify and track the location of objects or people in real-time typically within a structure (e.g., hospital) or other enclosed area. These systems utilize wireless tags such as RTLS tags which are attached to the objects or worn by humans, and utilize fixed reference points which receive wireless signals from the RTLS tags to determine their current location. In typical operation, the RTLS tags (e.g., so-called "active" transponder tags) transmit a long-range signal (i.e., up to thousands of meters in accordance with recognized communications standards) at regular intervals, and location sensors receive and process the tag signals, and a location appliance collects and correlates the data for determining the current location of the object and/or person. In this way, RTLS typically allows for the positioning of multiple objects, usually in an indoor environment, in the range of tens of centimeters. RTLS is currently used in a variety of applications such as employee safety, workforce optimization, asset management, indoor navigation, and factory automation covering industries such as retail, construction, healthcare, manufacturing, education, and entertainment.

A robotic total station (also referred to as a "total station") is an electronic/optical instrument used in modern surveying and construction, for example. The robotic total station is an electronic theodolite integrated with an electronic distance meter (EDM) to read slope distances from the instrument to a particular point and allows for a single person to effectively locate a target with assistance. That is, robotic total stations eliminate the need for multiple persons at the location of the total station to acquire a set of measurements. In one application of a robotic total station, the single user is at the target and sights the total station visually from the target and, upon visually locating the robotic total station, the user initiates an angular scanning sequence at the robotic total station to obtain more precise angular and distance measurements. The robotic total station automatically aligns itself with the target using, for example, servo motors that cause the robotic total station rotate towards the target. Once the robotic total station is aligned with the target (which is reflective in nature and may utilize one or more reflectors or prisms for such purpose), the angle and distance measurements can be taken and the position of the target may be determined in real-time or at some later time after a survey is completed, for example. In this way, a robotic total station typically allows for the precise positioning of a single object in the millimeter range.

BIM usage is fast growing in the construction and engineering fields and encompasses a process for creating and managing all of the information on a project (before, during, and after construction). The output of the BIM process is a digital model describing every aspect of the constructed asset that is the focus of the project. BIM uses three-dimensional (3D) design and software modeling that provides a set of inter-related and cross-referenced information specific to the project. BIM objects in the model linked to related information such as manuals, specifications, photos, and warranty details. This allows, for example, the architects responsible for the project to use BIM to model the structure and perform analyses and to preview the final structure on the site. Further, for example, BIM allows the owner (or facility manager) of the facility to efficiently manage the structure after completion of construction.

As such, BIM is a powerful collaboration tool that through model creation and using BIM software promotes enhanced communication and collaboration among a range of parties providing access to large volumes of information (e.g., specific to construction or engineering projects). BIM facilitates full-cycle analyses for a project not just as a design tool but throughout the construction process, how project management can be delivered, and inform the project's owner beyond the design process such as assisting in short or long term maintenance decisions.

As will be appreciated, the aforementioned RTLS, RTS, and BIM technologies each have respective individual strengths in their ability to provide powerful positioning, information management, modeling, and other features to applicable operating environments (i.e., indoor vs. outdoor) and potential positioning targets (i.e., one at a time vs. multiple). For example, for an outdoor application, a Global Navigation Satellite System (GNSS) may be used with RTLS and/RTS for positioning a variety of targets on an outdoor worksite.

Therefore, a need exists for leveraging and combining the use of RTLS, RTS, and BIM into a single, transparent system that delivers enhanced object positioning, recognition, tracking, and operation.

BRIEF SUMMARY OF THE EMBODIMENTS

In accordance with various embodiments, an object recognition and positioning system is provided that employs real-time location, a robotic total station, and a building information model in a single, transparent system that delivers object positioning, recognition, tracking, and operation.

More particularly, in accordance with an embodiment, a total station operates at a particular location on a worksite and serves to monitor a variety of BIM objects of the worksite (e.g., a plurality of construction objects such as air ducts, electrical boxes, walls, sheetrock, studs, and the like) and a plurality of tools being used on the worksite and/or a plurality of users working on the worksite. In accordance with the embodiment, a BIM model is provided that precisely models the plurality of BIM objects, and a tool model is provided for each of the tools in the plurality of tools.

In accordance with the embodiment, the total station, the plurality of tools and plurality of users utilize RTLS positioning for navigation and positioning. As such, the BIM objects, tools, and/or users are objects that can be recognized, tracked, and/or positioned by the total station. The plurality of tools and plurality of users are monitored by the total station along with their relative position to the particular task required on the worksite (e.g., mounting an electrical box on a wall using a power drill). In accordance with the embodiment, using the provided BIM model (e.g., as accessed by the total station via a communications network/cloud), the total station locks onto a particular tool and/or the user closest to the tasked destination (i.e., the location of the electrical box to be mounted on the wall as specified in the BIM model) and facilitates completion of the particular task and release of the tool upon task completion. In accordance with the embodiment, the total station provides positioning instructions to the user of the tool for task completion, or alternatively the positioning instructions may be provided directly to a "smart" tool which is capable of processing and executing on the positioning instructions.

In accordance with an embodiment, a modeled tool (or any modeled building component) can by discovered by the total station as noted previously or the tool may announce itself to the total station (by sending a wireless communication) once present on the worksite and in proximity to the total station. Further, in accordance with an embodiment, a particular tool may provide the tool's detailed industrial design model so the tool's particular shape may be identified by the total station for object tracking and navigation purposes. Illustratively, the tool may be equipped with a module that includes a processor, communications protocol (e.g. Bluetooth), memory (e.g., storing a unique identification code for the tool), user interface (e.g., display screen or LED outputs), and other hardware features (e.g., a connector to facilitate quick connection/release upon use).

These and other advantages of the embodiments will be apparent to those of ordinary skill in the art by reference to the following detailed description and the accompanying drawings.

DETAILED DESCRIPTION

In accordance with various embodiments, an object recognition and positioning system is provided that employs real-time location, a robotic total station, and a building information model in a single, transparent system that delivers object positioning, recognition, tracking, and operation.

Figure 1:
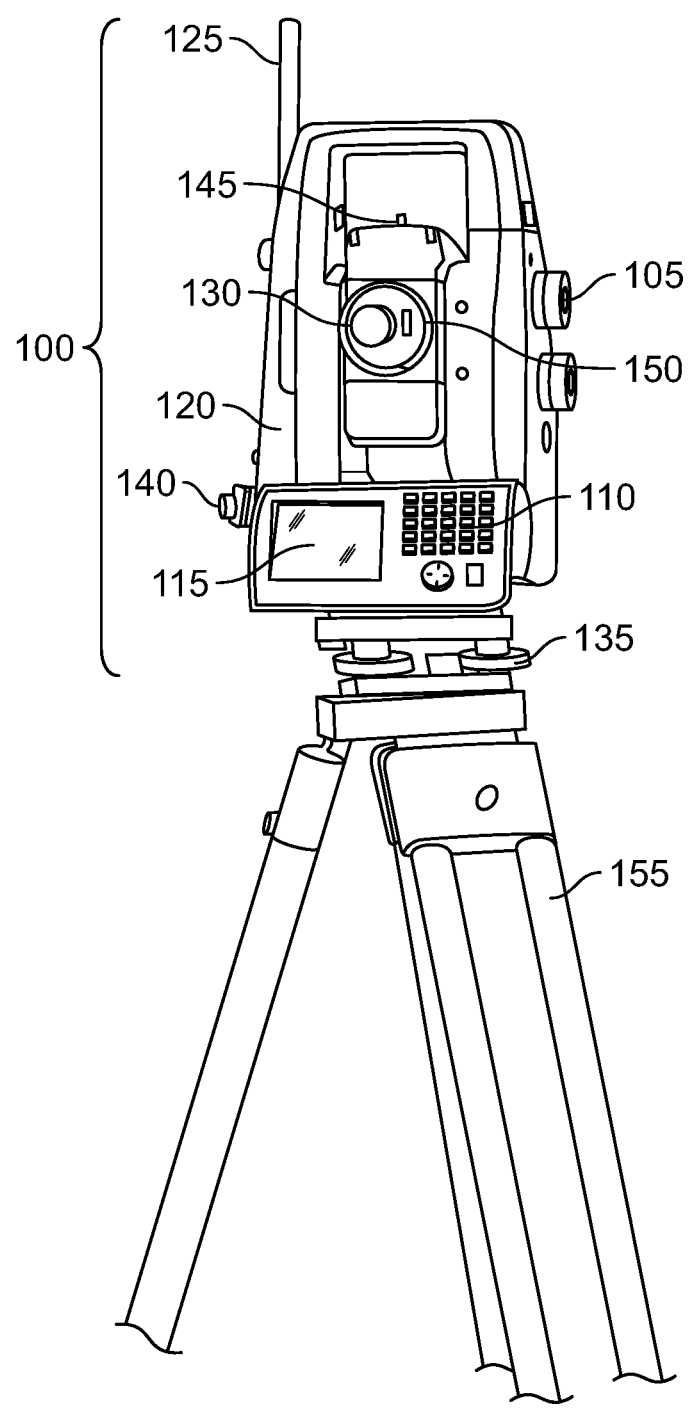
FIG. 1 shows an exemplary robotic total station configured in accordance with an embodiment.
Figure 2:
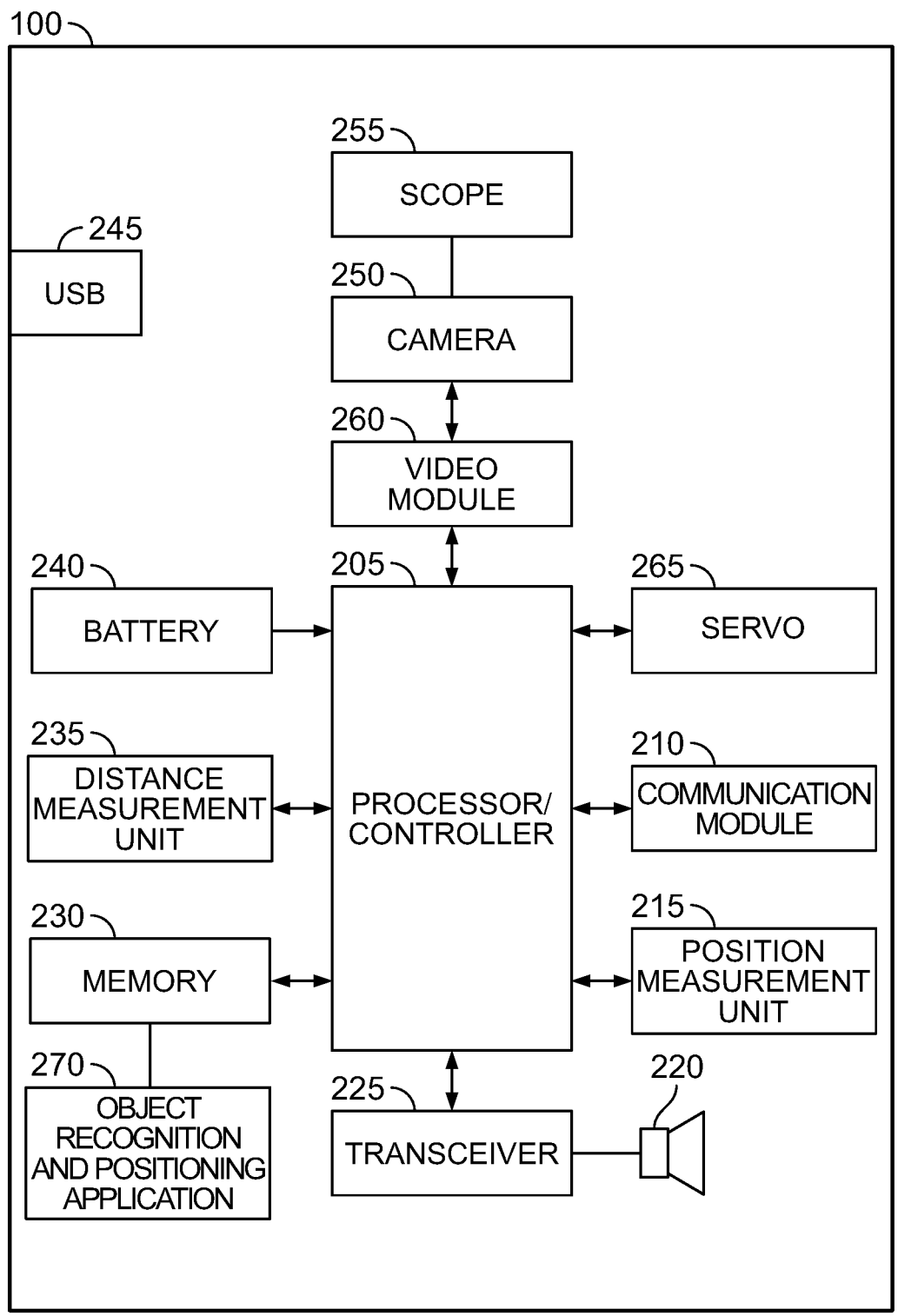
FIG. 2 shows a high-level block diagram of the robotic total station of FIG. 1 in accordance with an embodiment.

FIG. 1 shows an exemplary robotic total station (RTS) 100 configured in accordance with an embodiment, and FIG. 2 shows a high-level block diagram of RTS 100 of FIG. 1 in accordance with an embodiment. For ease of explanation and understanding of the embodiments herein, these Figures will now be discussed together. As shown, RTS 100 includes conventional elements such as housing 120 (typically a waterproof and dustproof housing) including antenna 125, servos 105 (e.g., ultra-fast servo motors) for aiming an optical sighting apparatus such as telescope 255 shown in FIG. 2 (with telescope 255 having telescope eyepiece 130 and telescope focusing knob 150), sighting collimator 145, keypad 110 (e.g., a backlit keyboard with directional arrow keys) for receiving commands from a human operator and display 115 (e.g., a color display) for displaying information to the human operator, for example. RTS 100 further includes servo(s) motors (e.g., servo(s) 265), leveling screws 135 and horizontal tangent screw 140 for controlling the position of RTS 100 which may be affixed to tripod 155 in a well-known fashion.

As further shown in FIG. 2, RTS 100 includes processor 205 for controlling the overall operation of RTS 100, an optical sighting apparatus such as telescope 255, video module 260 which may include a video semiconductor chip for providing compressed, digital video (e.g., MPEG-2) data from camera 250 to processor 205, distance measurement unit 235 for measuring distance from RTS 100 to a target using any number of well-known techniques, and position measurement unit 215 for detecting azimuth and elevation of optical sighting apparatus 255 using any number of well-known techniques. Processor 205 may include both general and special purpose microprocessors, and may be the sole processor or one of multiple processors of RTS 100. Processor 205 may comprise one or more central processing units (CPUs), for example, and may include, be supplemented by, or incorporated in, one or more application-specific integrated circuits (ASICs) and/or one or more field programmable gate arrays (FPGAs).

As will be appreciated, the operations of position measurement unit 215 and distance measurement unit 235 may be combined into a single unit in further embodiments. Battery 240 (e.g., lithium-ion) provides the overall power supply to RTS 100, and USB port 245 provides access to USB-type flash drives in a well-known way.

Transceiver 225 may be any device for transmitting and receiving data over a communications link (e.g., wireless data link) using antenna 220 in a conventional manner. Communications module 210 may provide RTS 100 with a variety of capabilities such as Bluetooth® communications. Memory 230 may comprise a tangible non-transitory computer readable storage medium, high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

In accordance with an embodiment, memory 230 stores various types of information (e.g., image data from camera 250, alphanumeric data or other types of data typically utilized by RTS 100) and object recognition and positioning application 270 for execution by processor 205 which will integrate the operations of RTS 100 in an object recognition and positioning system that employs real-time location, a robotic total station (e.g., RTS 100), and a building information model in a single, transparent system that delivers object positioning, recognition, tracking, and operations, as will be further detailed herein below.

Figure 3:
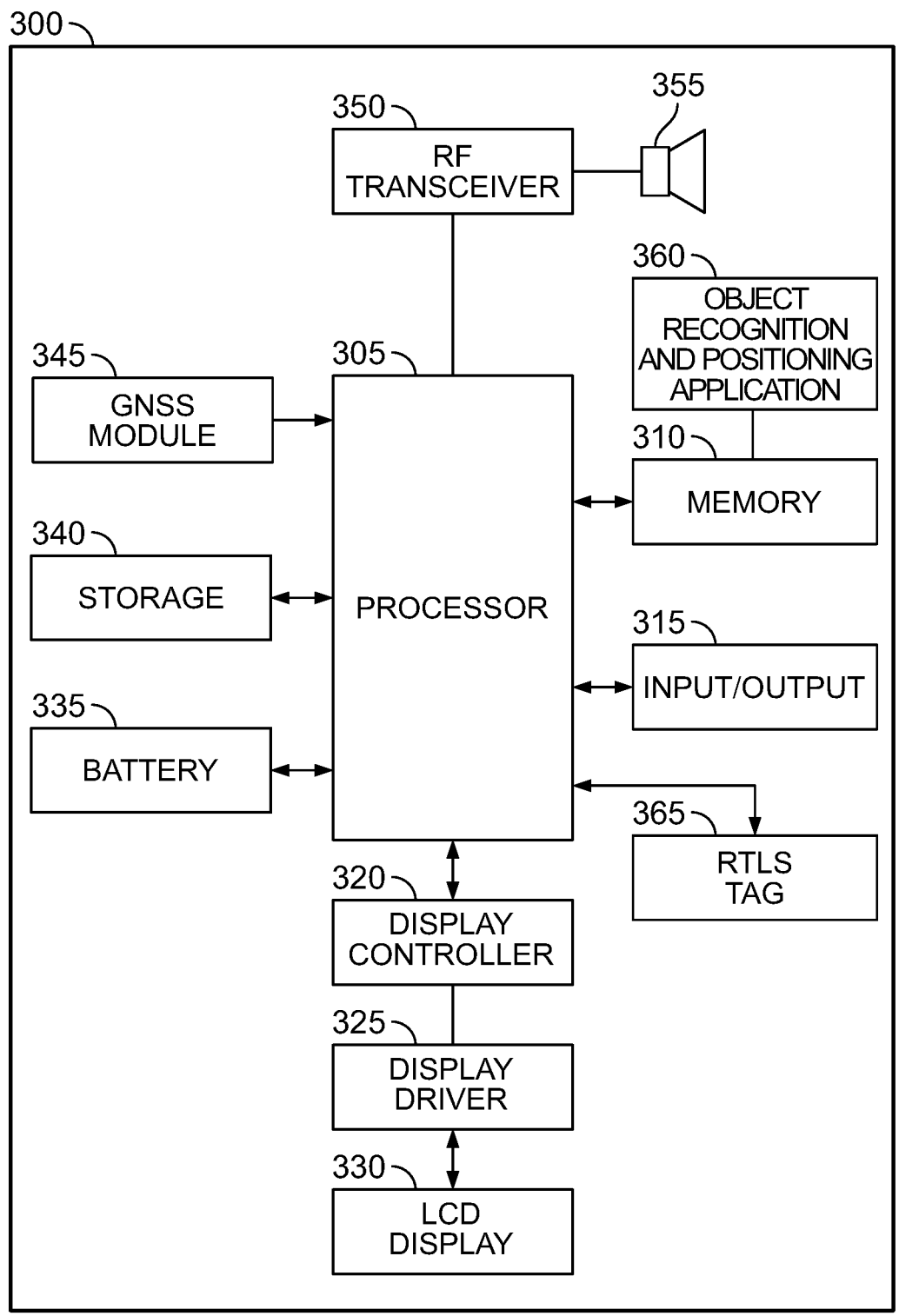
FIG. 3 shows a high-level block diagram of an exemplary tool device configured in accordance with an embodiment.

FIG. 3 shows a high-level block diagram of an exemplary tool device 300 configured in accordance with an embodiment for deployment by users in the object recognition and positioning system as detailed herein below. As shown, tool device 300 (e.g., a power tool, drill, screwdriver, nail gun, robot, wearable device (e.g., augmented reality glasses), or any other type of tool or apparatus that might be typically be found on a worksite that is operated by a user or operated remotely) includes processor 305 for controlling the overall operation of tool device 300, antenna 355, radio frequency (RF) transceiver 350, GNSS module 345 (for receiving and transmitting information, from and to a variety of communications networks, in a conventional and well-known manner), and RTLS tag 365 for use in locating tool device 300 in a well-known manner. As such, in accordance with the embodiments herein, tool device may any type of a modeled tool or any modeled building component.

Information (e.g., data) may also be stored in data storage device 340 and/or memory 310 which each may comprise a tangible non-transitory computer readable storage medium, and/or include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

In accordance with an embodiment, memory 310 also stores object recognition and positioning application 360 for execution by processor 305 which will integrate the operations of tool device 300 in the object recognition and positioning system that employs real-time location, a robotic total station (e.g., RTS 100), and a building information model in a single, transparent system that delivers object positioning, recognition, tracking, and operations, as will be further detailed herein below.

Tool device 300 further includes input/output devices 315 which may include any number of well-known peripherals, such as a camera, printer, scanner, display screen, navigation indicators, heads-up display (HUD), etc. In the illustrative embodiment shown in FIG. 3, display controller 320 operates in conjunction with display driver 325 to display information on LCD display 330 to the user of tool device 300. Battery 335 (e.g., lithium-ion) provides the overall power supply to tool device 300 in a well-known fashion.

As noted previously, in accordance with various embodiments, a system is provided that combines the use of RTLS, a RTS (e.g., RTS 100), one or more tool devices configured as detailed above (i.e., tool device 300), and a BIM for delivering the object recognition and positioning system employing real-time location in a single, transparent system that allows for object positioning, recognition, tracking, and operations, as will be further detailed herein below.

Figure 4:
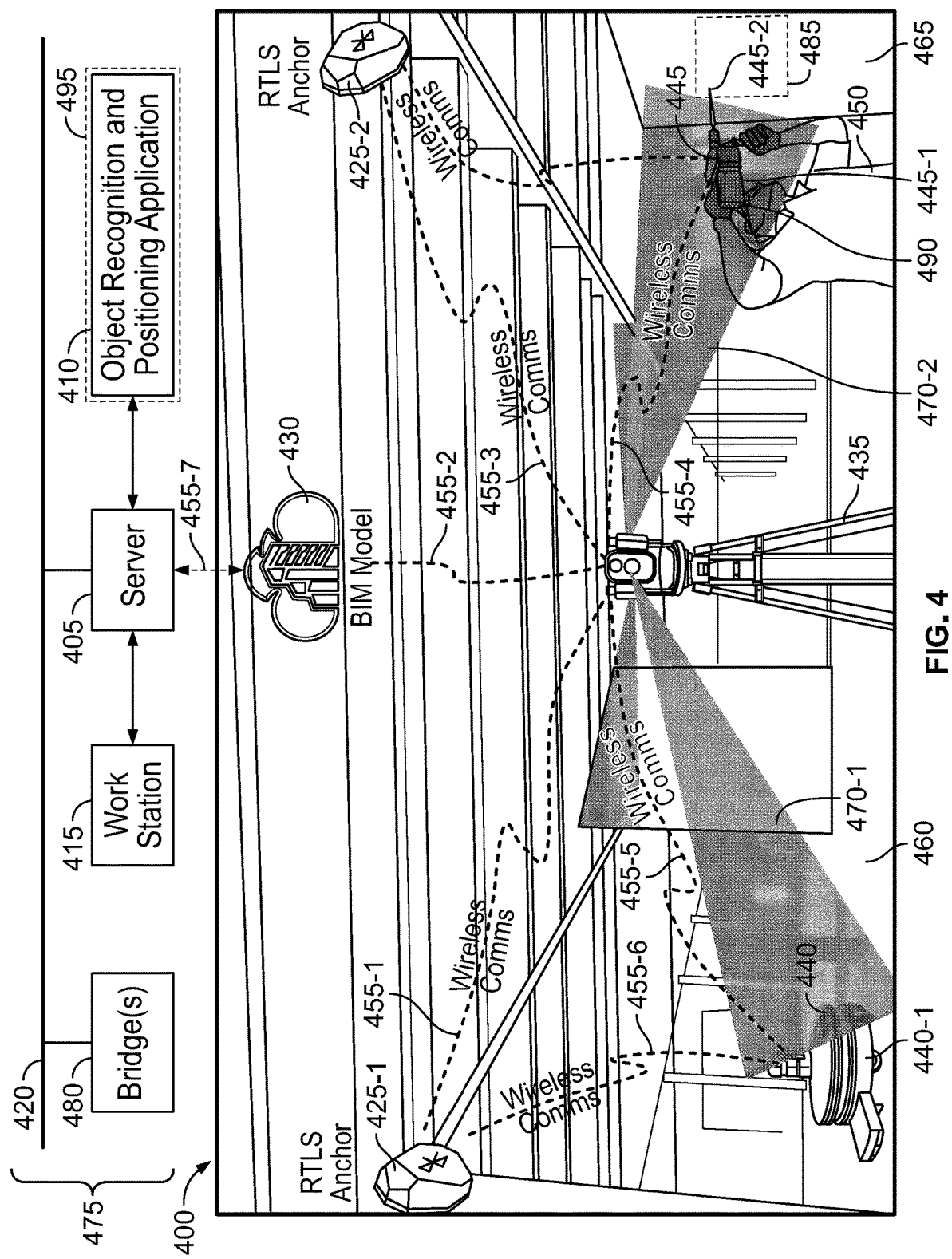
FIG. 4 shows a diagram of an exemplary real-time object recognition and positioning system configured in accordance with an embodiment.

To that end, FIG. 4 shows a diagram of an exemplary real-time object recognition and positioning system 400 configured in accordance with an embodiment. As shown, RTLS 475 includes server 405 interconnected with workstation 415 (e.g., a conventional computer) and communicating across communications link 420 (e.g., an Ethernet local area network). Server 405, in accordance with an embodiment, communicates with BIM model 430 (illustratively stored in a cloud computing network architecture) over communications link 455-7 in a well-known manner (e.g., an Ethernet or wireless communication) for accessing one or more BIM design models associated with worksite 460. As will be appreciated, BIM model 430 may be accessible via well-known cloud computing and remotely located from worksite 460. Server 405 has access to memory 495 for executing object recognition and positioning application 410 which, in accordance with the embodiment, will integrate the operations of RTLS 475 in object recognition and positioning system 400 which combines the use of RTLS 475, RTS 435, BIM model 430 in a single, transparent system that delivers object positioning, recognition, tracking, and operations.

RTLS 475 includes anchors (i.e., anchor 425-1 and 425-2) and tool device 440 and tool device 445 are each configured in accordance with tool device 300 so each will have respective tags (i.e., tag 440-1 and tag 445-1) which work in combination to deliver real-time location by RTLS 475 in a well-known manner. That is, tags 440-1 through 445-1 may be battery-operated mobile radio nodes that are affixed to tool device 440 (illustratively shown as a robot traversing worksite 460 in an automated and remotely controlled fashion as will be well understood), and tool device 445 (illustratively shown as a power drill operated by user 450) and utilized to track and/or navigate such objects and/or people. For example, tracking construction assets (e.g., tool device 440 and tool device 445) or personnel (e.g., user 450) on a particular worksite (e.g., worksite 460) to improve asset utilization, minimize time spent locating critical construction assets, maximize workforce efficiency, enable resource allocation, and/or improve workflow optimization including but not limited to providing instructions for positioning tool device 440 and/or tool device 445 within a particular area of worksite 460 (e.g., the work area shown in FIG. 4 where user 450 is illustratively operating tool device 445 to drill into wall 465 using drill bit 445-2).

Anchors 425-1 and 425-2 form a wireless mesh network (e.g., Bluetooth or Ultra-Wide Band (UWB)), in a conventional manner, across RTLS 475 and are in contact with each other (illustratively, over communications links 455-1, 455-3, 455-3, 455-4, 455-5, and 455-6 which are wireless communications links, and all tags (e.g., tags 440-1 and 445-1) that may be in their vicinity (typically fifty (50) meters for outside line-of-site environments, and thirty (30) meters for inside environments such as worksite 460). Bridge(s) 480 facilitate the communication of network traffic from tags 440-1 and 445-1, for example, to server 405. As will be appreciated, any number of tool devices, RTS devices, persons, tags, bridges, anchors, etc. can be configured in accordance with the principles of the embodiments herein.

Again, in accordance with various embodiments, object recognition and positioning system 400 employs real-time RTLS, robotic total station(s), and building information model(s) in a single, transparent system that delivers object positioning, recognition, tracking, and operation. To that end, as shown in FIG. 4, RTS 435 (illustratively configured in accordance with RTS 100 shown in FIGS. 1 and 2 as detailed herein above) periodically scans (e.g., field of view 470-1 and field of view 470-2) worksite 460 in a well-known manner using a 360 degree rotation. Further, RTS 435, in accordance with an embodiment, the total station has the ability to generate a real-time point cloud in the total station's field of view for discovering known shape(s) within the point could (e.g., a thirty (30) degree window point cloud). In accordance with the embodiment, RTS 435 will define a respective point cloud for a respective field of view (e.g., field of view 470-1 and/or 470-2). As will be appreciated, a point cloud is a set of data points in a specific coordinate system. For example, in a three-dimensional coordinate system, these points are usually defined by X, Y, and Z coordinates, and often are intended to represent the external surface of an object.

For example, user 450 is working in worksite 460 and is carrying tool device 445. User 450, in this illustrative scenario, is tasked with drilling multiple pilot holes using drill bit 445-2 in wall 465 which will used to later mount electrical panel 485 on wall 465 at a location defined by BIM model 430. In accordance with the embodiment, all tool devices (e.g., tool device 440 and tool device 445) and other objects within the worksite (e.g., wall 465) are precisely modeled as so-called BIM objects which are well-known 3D representations that embody a digital description of each aspect of a particular built asset (e.g., building, work site, highway, etc.). Typically, a broad range of project information (e.g., drawings, specification sheets, supply chain, etc.) are linked to the 3D BIM model to provide complete picture for the built asset being modeled. As such, these BIM objects can be recognized, tracked, and positioned by RTS 435 in combination with the BIM model.

For example, tool device 445 (and tool device 440) are monitored in real-time by RTS 435 along with their relative position to the task required (in this illustrative scenario, the drilling of pilot holes into wall 465 by user 445 using tool device 445) as determined by a combination of RTLS 475 and RTS 100 that work together and transparently. The operations for such transparent positioning can be in accordance with the details of U.S. Patent Publication Application No. 2017/0353824A1, which is hereby incorporated by reference in its entirety. As such, tool device 445-1, RTS 435, and server 405 will cooperate to process and provide the positioning details which will be cooperatively delivered by RTLS 475 and RTS 435 for positioning user 450 and/or tool device 445 within worksite 460 and relative to wall 465 or completion of the desired drilling task. As noted above, in accordance with the embodiments herein, tool device 445 may any type of a modeled tool or any modeled building component.

For example, in accordance with the embodiment shown in FIG. 4, a distance will be specified (e.g., 20 centimeters) relative to the target (e.g., wall 465) such that RTLS 475 will be engaged for all positioning in an area outside of the specified distance, and RTS 435 will be engaged for all positioning inside the specified area. The specified distance parameter is a user (or system) defined setting that is typically based on the quality of positioning available from RTLS 475 and selected to facilitate the transparent handoff and switching from RTLS 475 to RTS 435, all without user intervention. As such, the specified distance setting may be incorporated directly into RTS 435, for example, as part of a manufacturer setting or may be specified directly by a user in the field. In essence, there is a transition point at which a transparent and seamless hand-off of positional processing will occur between RTLS 475 and RTS 435 thereby providing an "on-the-fly" transition between RTLS 475 and RTS 435.

As noted above, RTS 435 will be scanning worksite 460 and will lock on to user 450 or tool device 445 depending upon which is closer to the tasked destination (i.e., wall 465). In accordance with the embodiment, when RTS 435 locks on to tool device 445, for example, tool device 445 will provide (e.g., over communications link 455-4) the tool's specific industrial model to that RTS 435 in combination with access to BIM model 430 will be trained to identify the specific tool shape of tool device 445 for object tracking and navigation. In a further embodiment, tool device 445 may "announce" itself to, and be discovered by RTS 435, by using a well-known Internet of Things (IoT) module that enables devices equipped with such an IoT module to connect to a wide variety of wireless networks and send/receive data. In this way, given the IoT modules enable "always on" communication capabilities for automatic data communication (i.e., without user input to initiate) they are engineered for extreme durability and longevity thereby justifying their higher manufacturing costs.

Server 405, by and through object recognition and positioning application 410, will then be used for monitoring the respective positions of tool device 445, for example, while the tool device remains in the area that is greater than 20 centimeters from the target. However, when server 405 detects that tool device 445 has transitioned to the area within 20 centimeters server 405 the positioning provider will transition to RTS 435 from RTLS 475. Further, in accordance with the embodiment, RTS 435 will have access to BIM model 430 which will provide specific operational details for the designated task. In the current example, BIM model 430 will provide BIM data associated with at least worksite 460, wall 465, and electrical panel 485 associated with the designated task of mounting electrical panel 485 on to wall 465. In accordance with the embodiment, RTS 435 will combine the BIM data from BIM model 430 with that of the point cloud established from field of view 470-2 for object recognition (e.g., tool device 445) and positioning specific to the designated task (e.g., positioning of drill bit 445-2 on wall 465 and drilling the mounting hole for electrical box 485).

Once RTS 435 has access to the BIM data from BIM model 430 and combines that with the point cloud from field of view 470-2, RTS 435 can communicate with tool device 445 in order to position tool device 445 correctly for the drilling of the holes in wall 465 by user 450. Upon task completion, RTS 435 may be released by tool device 445 and lock on to the next user or tool device for the next designate task. As such, RTS 435 serves as a hub on worksite 460 for multiple connections to multiple (and sometimes disparate) BIM objects.

In a further embodiment, user 450 may be equipped with augmented reality glasses 490 for aligning tool device 445 (i.e., the BIM object) into position relative to wall for 465 for drilling. Precise positioning data is exchanged from RTS 435 to augmented reality glasses 490 to allow user 450 to position the virtual BIM object (i.e., tool device 445) in the right location in a real-time fashion. As will be appreciated such wearables, will provide user 450 on a wearable display with precise information for tracking and locating the BIM object (e.g., tool device 445) using the BIM information provide by BIM model 430. In a further embodiment, tool device 445 may be equipped with a small display to guide user 450 to the destination location for tool device 445 and/or have LED directional arrows.

Further, while the illustrative example of FIG. 4 is primarily an indoor environment, the principles of the embodiment are equally applicable to an indoor environment and/or a mixed indoor and outdoor environment. For example, in a further embodiment, RTLS 475 will be used for object recognition and positioning for both indoor and outdoor environment, and RTS 435 will be used in the outdoor environment. Thus, for example, user 450 may start within worksite 460 (an indoor location), finish a task, and then move outside. In accordance with a further embodiment, outdoor positioning can be also optionally delivered by a GNSS network (e.g., the US Global Positioning System (GPS), the Russian GLONASS or European GALILEO, as are well-known).

Figure 5:
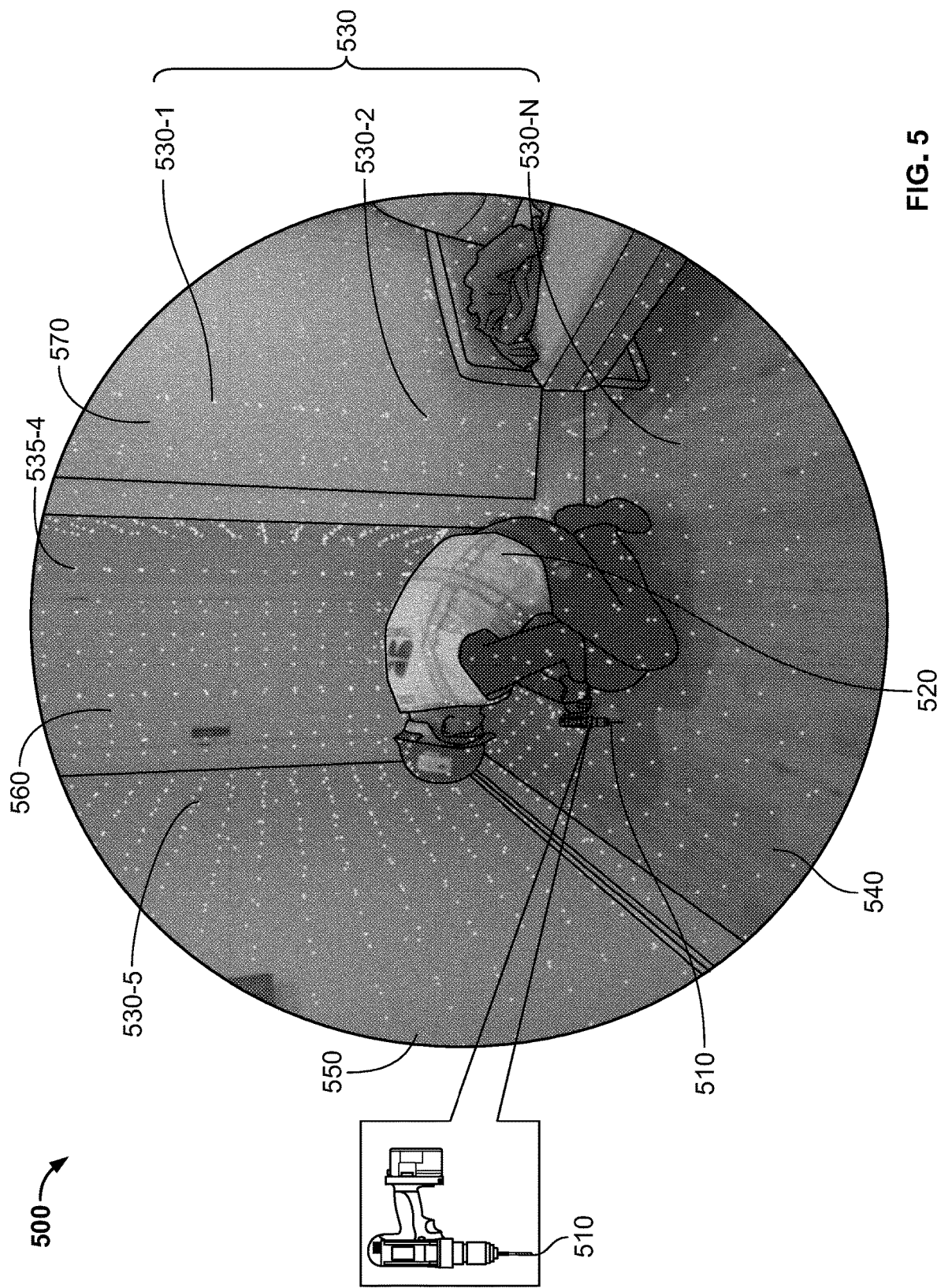
FIG. 5 shows an illustrative worksite and point cloud in accordance with an embodiment.
Figure 6:
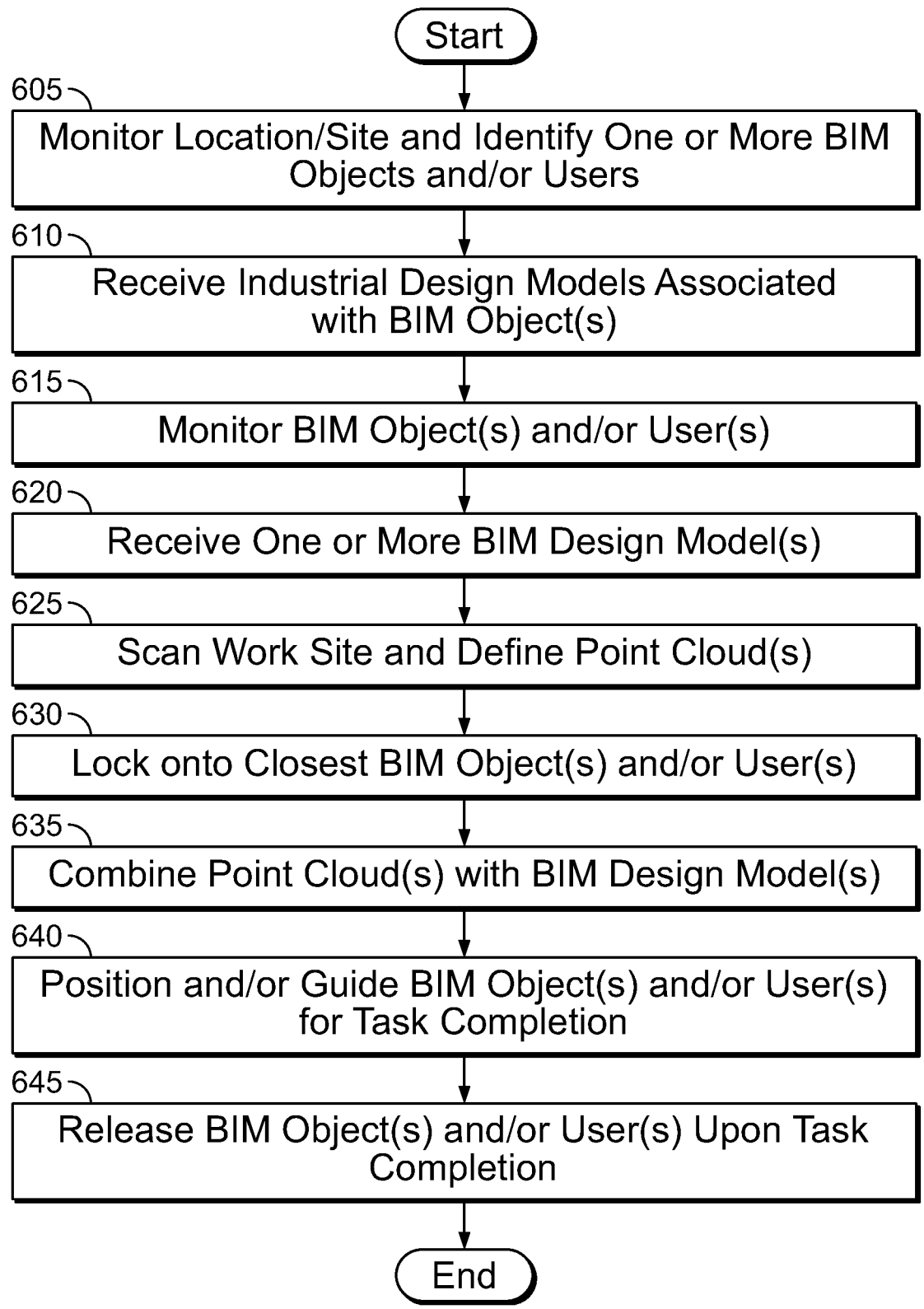
FIG. 6 shows a flowchart of illustrative operations for real-time object recognition and positioning system in accordance with an embodiment.

FIG. 5 shows an illustrative worksite and point cloud in accordance with an embodiment. As shown, worksite 500 is an indoor area having floor 540, wall 550, door 560, and wall 570. User 520 has been dispatched to complete a repair to floor 540 using drill 510. As detailed above, in accordance with an embodiment, an RTS monitors the indoor area of worksite 500 and identifies one or more BIM objects (e.g., drill 510) and user 520. An industrial design models for drill 510 is received, and drill 510 (i.e., the BIM object) and user 520 are monitored using RTLS positioning (e.g., RTLS 475) for course navigation purpose. As detailed above, one or more BIM design models associated with worksite 500 are received by the RTS (e.g., RTS 435), and the RTS will scan worksite 500 and define point cloud 530 for a respective field of view defined by the scan and comprising points 530-1, 530-2, 530-3, 530-4, 530-5 through 530-N. The RTS will lock on to drill 510 and/or user 520 given they are necessary for completing a particular task (as defined in the BIM model) required on worksite 500. Point cloud 530 will be combined with the BIM model in real-time by the RTS for recognizing, tracking, and positioning drill 510 (i.e., the object recognized) and/or user 520. In this way, the RTS positions and/or guides drill 510 and/or user 520 for task completion, as detailed above. FIG. 6 shows a flowchart of illustrative operations for real-time object recognition and positioning system. At step 605, an RTS monitors a particular location or site (e.g., work site 460) and identifies one or more BIM objects (e.g., tool device 445) and/or users thereon, and, at step 610, industrial design models for the one or more BIM objects (i.e., tool device(s)) are received, illustratively, the identified tool(s) provide their industrial design model directly to the RTS (e.g., RTS 435), or the RTS may receive a library of different tool types that it can track and position, as detailed above. At step 615, the BIM object(s) and/or user(s) are monitored using RTLS positioning (e.g., RTLS 475) for course navigation purpose. At step 620, one or more BIM design models associated with a particular work site (or project) are received by the RTS. At step 625, the RTS will scan the work site (e.g., work site 460) and define a respective point cloud for a respective field of view defined by the scan (e.g., field of view 470-2) and, at step 630, locks on to the closest BIM object(s) and/or user(s) that are necessary for completing a particular task (as defined in the BIM model) required on the worksite. At step 635, the respective point cloud will be combined with the BIM model in real-time by the RTS for recognizing, tracking, and positioning the BIM object(s) and/or user(s) locked onto by the RTS (i.e., the closest) and, at step 640, the RTS positions and/or guides the BIM object(s) and/or user(s) for task completion, as detailed above. At step 645, upon task completion, the BIM object(s) and/or user(s) is/are released by the RTS.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operating a robotic total station (RTS) comprising:
   monitoring a site;
   discovering a plurality of building information modeling (BIM) objects associated with the site;
   monitoring a subset of the plurality of BIM objects associated with the site and a relative position of each BIM object of the subset of the plurality of BIM objects with respect to a task required to be performed on the site;
   receiving a BIM model associated with the site;
   scanning the site;
   defining a respective point cloud for a respective point of view from scanning the site, the respective point cloud comprising a plurality of point cloud data;
   locking onto a particular one BIM object in the subset of the plurality of BIM objects that is necessary for performing the task; and
   positioning, using the respective point cloud in combination with the BIM model, the particular one BIM object necessary for performing the task.

2. The method of claim 1 further comprising:
   releasing, upon completing the task, the particular one BIM object necessary for performing the task.

3. The method of claim 1 wherein the monitoring a subset of the plurality of BIM objects associated with the site and a relative position of each BIM object of the subset is performed at least in part using a real-time location system (RTLS) in communication with the RTS.

4. The method of claim 1 further comprising:
   receiving, from the particular one BIM object, an industrial design model specific thereto; and
   using the industrial design model in the positioning of the particular one BIM object.

5. The method of claim 1 further comprising:
   discovering a particular one user of a plurality of users associated with the site; and
   monitoring the particular one user and a relative position of the particular one user with respect to the task required to be performed on the site.

6. The method of claim 5 further comprising:
   positioning, using the respective point cloud in combination with the BIM model, the particular one user for performing the task while using the particular one BIM object.

7. The method of claim 6 wherein the BIM model comprises BIM data associated with at least the site and the task to be performed on the site.

8. The method of claim 7 further comprising:
   combining the BIM data with the point cloud data.

9. The method of claim 6 further comprising:
displaying, on the particular one BIM object, a guide for positioning the particular one BIM object by the particular one user.

10. The method of claim 1 wherein the site comprises an indoor environment.

11. The method of claim 1 wherein the site comprises both an indoor environment and an outdoor environment.

12. The method of claim 6 further comprising:
transmitting positioning data to a wearable device on the particular one user for positioning the particular one BIM object in completing the task.

13. The method of claim 1 further comprising:
determining, prior to the locking onto, whether the particular one BIM object is within a specified proximity to a location on the site associated with the task.

14. A robotic total station (RTS) comprising:
a processor;
a memory to store computer program instructions, the computer program instructions when executed on the processor cause the processor to perform operations comprising:
monitoring a site;
discovering a plurality of building information modeling (BIM) objects associated with the site;
monitoring a subset of the plurality of BIM objects associated with the site and a relative position of each BIM object of the subset of the plurality of BIM objects with respect to a task required to be performed on the site;
receiving a BIM model associated with the site;
scanning the site;
defining a respective point cloud for a respective point of view from scanning the site, the respective point cloud comprising a plurality of point cloud data;
locking onto a particular one BIM object in the subset of the plurality of BIM objects that is necessary for performing the task; and
positioning, using the respective point cloud in combination with the BIM model, the particular one BIM object necessary for performing the task.

15. The robotic total station of claim 14 wherein the operations further comprise:
releasing, upon completing the task, the particular one BIM object necessary for performing the task.

16. The robotic total station of claim 14 wherein the monitoring a subset of the plurality of BIM objects associated with the site and a relative position of each BIM object of the subset is performed at least in part using a real-time location system (RTLS) in communication with the RTS.

17. The robotic total station of claim 14 wherein the operations further comprise:
receiving, from the particular one BIM object, an industrial design model specific thereto; and
using the industrial design model in the positioning of the particular one BIM object.

18. The robotic total station of claim 14 wherein the operations further comprise:
discovering a particular one user of a plurality of users associated with the site; and
monitoring the particular one user and a relative position of the particular one user with respect to the task required to be performed on the site.

19. The robotic total station of claim 18 wherein the operations further comprise:
positioning, using the respective point cloud in combination with the BIM model, the particular one user for performing the task while using the particular one BIM object.

20. The robotic total station of claim 14 wherein the BIM model comprises BIM data associated with at least the site and the task to be performed on the site.

21. The robotic total station of claim 20 wherein the operations further comprise:
combining the BIM data with the point cloud data.

22. The robotic total station of claim 19 further comprising:
a display for displaying a guide for positioning the particular one BIM object by the particular one user.

23. The robotic total station of claim 14 wherein the site comprises an indoor environment.

24. The robotic total station of claim 14 wherein the site comprises both an indoor environment and an outdoor environment.

25. The robotic total station of claim 19 wherein the operations further comprise:
transmitting positioning data to a wearable device on the particular one user for positioning the particular one BIM object in completing the task.

26. The robotic total station of claim 14 wherein the operations further comprise:
determining, prior to the locking onto, whether the particular one BIM object is within a specified proximity to a location on the site associated with the task.

* * * * *